(12) United States Patent
Wan et al.

(10) Patent No.: US 11,966,409 B2
(45) Date of Patent: *Apr. 23, 2024

(54) EXTENSIBLE ATTRIBUTES FOR DATA WAREHOUSES

(71) Applicant: Oracle International Corporation, Redwood Shores, CA (US)

(72) Inventors: Dylan Wan, Fremont, CA (US); Francoise J. Lawrence, Dublin, CA (US); Justin Hyde, Oakland, CA (US); Amit Goyal, E. Palo Alto, CA (US); Saurabh Verma, Cupertino, CA (US); John D. Poole, Stratford, CT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/848,632

(22) Filed: Apr. 14, 2020

(65) Prior Publication Data
US 2020/0272635 A1 Aug. 27, 2020

Related U.S. Application Data

(63) Continuation of application No. 15/299,273, filed on Oct. 20, 2016, now Pat. No. 10,635,686.

(60) Provisional application No. 62/362,756, filed on Jul. 15, 2016, provisional application No. 62/244,461, filed on Oct. 21, 2015.

(51) Int. Cl.
*G06F 16/25* (2019.01)

(52) U.S. Cl.
CPC ................... *G06F 16/254* (2019.01)

(58) Field of Classification Search
CPC ....................................... G06F 16/254
See application file for complete search history.

(56) References Cited

U.S. PATENT DOCUMENTS

| 8,504,534 | B1 | 8/2013 | Tendick et al. | |
| 9,442,993 | B2* | 9/2016 | Tung | G06F 16/252 |
| 9,910,903 | B1 | 3/2018 | Jilani et al. | |
| 2006/0190931 | A1* | 8/2006 | Scott | G06F 8/20 |
| | | | | 717/136 |
| 2009/0083306 | A1* | 3/2009 | Sichi | G06Q 10/00 |

(Continued)

OTHER PUBLICATIONS

Oracle, Siebel Tools Reference, Bookshelf v7.5.3: Extension cols. website: https://docs.oracle.com/cd/E05554_01/books/ToolsRef/ToolsRefdataobj 12.html, published on Oct. 20, 2003 (Year: 2003) (Year: 2003).*

(Continued)

*Primary Examiner* — Irete F Ehichioya
*Assistant Examiner* — Xiaoqin Hu
(74) *Attorney, Agent, or Firm* — Kilpatrick Townsend & Stockton LLP

(57) ABSTRACT

Systems and methods for implementing extensible attributes in ETL are disclosed. In some examples, attributes configured at a source file may be extracted from the source file. The extracted attributes can be mapped to a target column of a data warehouse table, and then a dynamic ETL script may be generated. The dynamic script may be executed to move data associated with the attributes to an appropriate new column of the data warehouse.

21 Claims, 15 Drawing Sheets

(56) References Cited

U.S. PATENT DOCUMENTS

| | | | |
|---|---|---|---|
| 2011/0295866 A1* | 12/2011 | Fot | G06F 16/217 |
| | | | 707/756 |
| 2012/0254259 A1 | 10/2012 | Mcguire et al. | |
| 2014/0006103 A1 | 1/2014 | Yaseen et al. | |
| 2015/0234870 A1* | 8/2015 | Kumar | G06F 16/13 |
| | | | 707/807 |
| 2016/0371275 A1 | 12/2016 | Bernstein et al. | |
| 2017/0109392 A1 | 4/2017 | Hamedani | |
| 2017/0116295 A1 | 4/2017 | Wan et al. | |

OTHER PUBLICATIONS

"Extension Columns", Oracle, Siebel Tools Reference, Bookshelf v7.5.3, Available online at: https://docs.oracle.com/cd/E05554_01/books/ToolsRef/ToolsRefdataobj 12.html, Oct. 20, 2003, 2 pages.

U.S. Appl. No. 15/299,273, "Final Office Action", dated Feb. 7, 2019, 21 pages.

U.S. Appl. No. 15/299,273, "Non-Final Office Action", dated Sep. 10, 2018, 18 pages.

U.S. Appl. No. 15/299,273, "Non-Final Office Action", dated Jun. 27, 2019, 21 pages.

U.S. Appl. No. 15/299,273, "Notice of Allowance", dated Dec. 31, 2019, 9 pages.

* cited by examiner

EXTENSIBLE ATTRIBUTES FOR DATA WAREHOUSES

CROSS-REFERENCES TO RELATED APPLICATIONS

The present application is a continuation of U.S. application Ser. No. 15/299,273, filed Oct. 20, 2016, entitled "EXTENSIBLE ATTRIBUTES FOR DATA WAREHOUSES," which claims benefit and priority under 35 U.S.C. § 119(e) to U.S. Provisional Application No. 62/244,461, filed Oct. 21, 2015 and U.S. Provisional Application No. 62/362,756, filed Jul. 15, 2016, the disclosures of which are incorporated herein by reference.

BACKGROUND

Enterprise customers add custom fields in source systems and then wish to report on metrics by that custom field in their data warehouse. In order to support such customization, IT departments modify the data warehouse model, Extract, Transform, and Load (ETL) framework, and reporting workflow. As source systems and data warehouses move to the cloud, there is no IT involvement and it would be too expensive to add new fields and customize and redeploy the data model, ETL framework, and reporting workflows in the cloud.

BRIEF SUMMARY

Embodiments described herein relate to solving the above problem for cloud-based Business Intelligence (BI) application services. Apart from the data mappings from source to target for the Extensible attributes via ETL, the solution dynamically maps metadata from the source like labels, language and list of supported values for the custom fields from the source systems.

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

In some examples, a method, a system, and a computer-readable medium may be provided. The method, the system, and/or the computer-readable medium may comprise receiving metadata from a customer source, the metadata identifying an attribute for a data warehouse table, extracting the attribute from the metadata, mapping the attribute to a target column of the data warehouse table, generating dynamic code to move data associated with the attribute into the target column of the data warehouse table, and/or executing the dynamic code to move the data into the target column. In some examples, the method, system, and/or computer-readable medium may comprise showing the attribute in a native language of the customer source, providing a report to the customer source based at least in part on the attribute, extracting label information associated with the attribute from the metadata, and/or further comprising providing the label information in the report. In some examples, the attribute may be a new attribute to be added to the data warehouse table that did not exist in the data warehouse table prior to receipt of the metadata, the attribute may be provided to a staging environment prior to mapping the attribute to the target column, and/or the mapping may be performed dynamically for each of a plurality of attributes, and wherein the attribute is one of the plurality of attributes. In some examples, the code may be generated dynamically based at least in part on a request to add a new attribute and/or the customer source may comprise a cloud service provider. Further, in some instances, the method, system, and/or computer-readable medium may be configured to refresh a column of attributes after the column has been added to the data warehouse table and/or the column of attributes may be refreshed without refreshing all of the data warehouse table.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
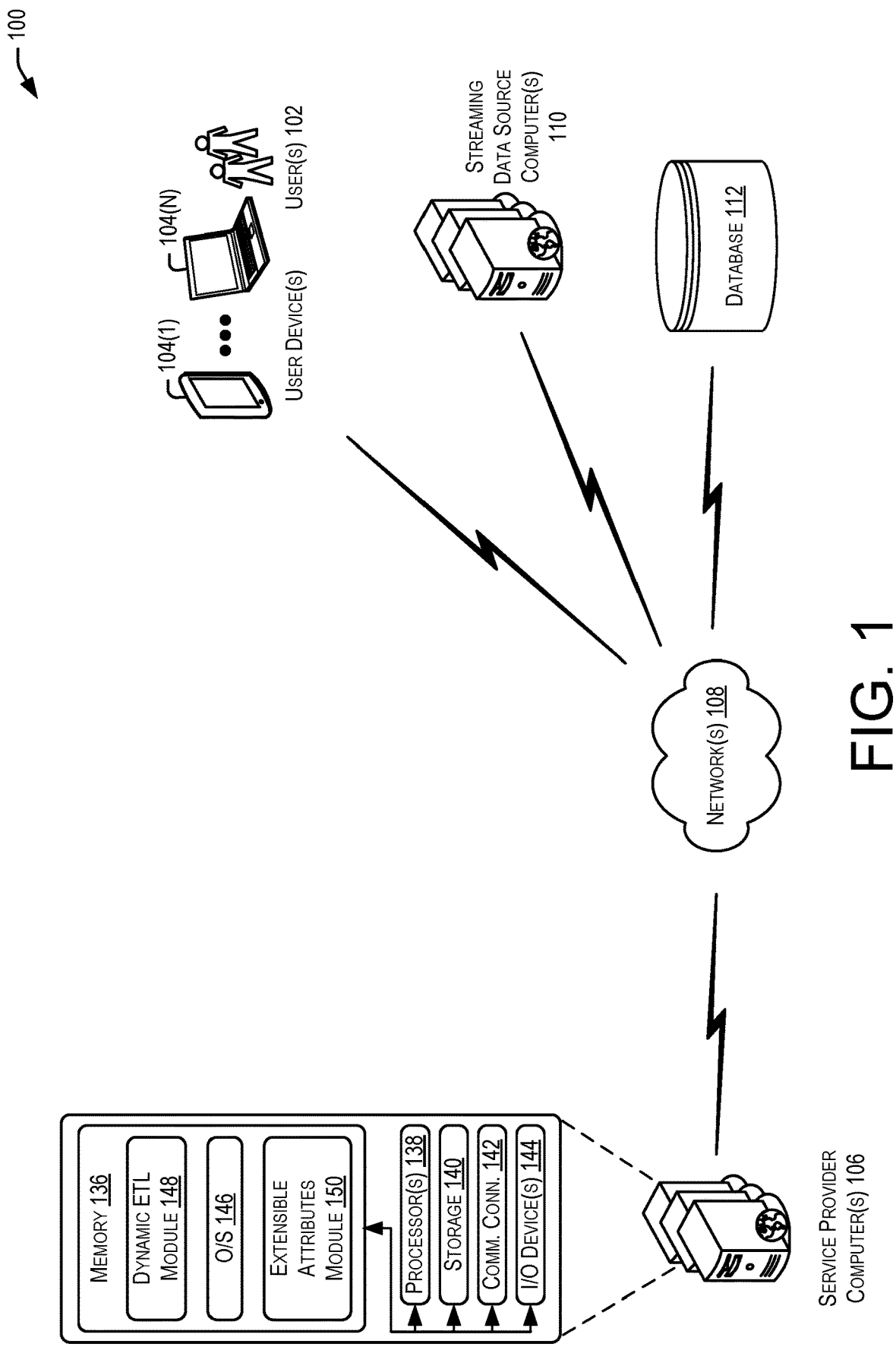
FIG. 1 is a simplified block diagram illustrating at least some example techniques for implementing the features described herein, according to at least one example.

In the following description, for the purposes of explanation, specific details are set forth in order to provide a thorough understanding of embodiments of the invention. However, it will be apparent that the invention may be practiced without these specific details.

Embodiments described herein relate to providing extensible attributes for data warehouses and/or for cloud-based Business Intelligence (BI) application services. Apart from the data mappings from source to target for the extensible attributes (e.g., using ETL and/or Extract, Load, and Transform (ELT) tools), the solution dynamically maps metadata from a source. For example, labels, languages, and lists of supported values for custom fields can be mapped from a source system to a target data warehouse. For traditional Enterprise systems deployed on-premise, customers can add custom fields in source systems (e.g. customer eye color) and may wish to report on metrics by that custom field in their data warehouse (e.g. revenue or preferences by customers with certain eye color).

As source systems and data warehouses move to the cloud, there is no IT involvement to change deployed code or modify the data warehouse and reporting system. It would be too expensive, time consuming, and processor intensive to add new fields and customize and redeploy the data model, ETL, and reporting workflows in the cloud.

In some examples, when it comes to report systems and data warehousing, there are source systems like a CRN system or an HR system. Imagine a customer adds a new field on the source side (e.g., eye color). For example, consider that a developer (customer) is running a promotion where, depending on the user's eye color, the customer might offer some promotion. Now, on the report, the customer might want to see data associated with eye color. For example, how many people clicked on something, or how many people bought something (with a particular eye color). May want to report based on the new attribute.

However, in general data warehouse systems, most elements are very fixed in nature. Some fields might have a number or a Variable Character Field (varchar), it might have particular language or other list of values, and/or it might have defined characteristics that are fixed. Developers then typically hard-wire these attributes into a large data warehouse, and then write up the logic to aggregate information based on certain dimensions, facts, etc. Then, at the data warehouse system, a report may be run based on that new attribute.

Generally, developers typically need to make requests to IT or other developers to add new attributes. The developers may then need to manually add the new attribute (e.g., eye color) for the system based on the particular request. However, this is not scalable in the cloud and as systems move to the cloud, adding new attributes becomes more challenging. For example, a cloud service may have thousands of customers, with potentially thousands of attributes, where it may be too difficult to change systems that are deployed for multiple users because, in some cases, a single system may be deployed on various different virtual processors (nodes) for multiple different customers (e.g., for each customer, a separate instance of the same system may be deployed on a different virtual machine).

In some examples, a certain number of columns in the data warehouse are selected for potential future customization (e.g., they are added and reserved). For example, some number (e.g., 50) may be reserved for numeric attributes and some other number (e.g., 20, 50, or 100) may be reserved for varchar. Once reserved, and a customer customizes (adds) a column for their deployment, the system may execute a dynamic mapping to the warehouse where the columns have been reserved. In some examples, ETL code (scripts) may be dynamically generated at every layer. For example, at every layer it may be determined whether the right language is being brought in, whether the right list of values is brought in, whether the right information is being provided to the report layer, the presentation layer, etc.

In some examples, when a customer enters some information to add a new column, some metadata is created. This metadata may be collected by the system and propagated into the data warehouse. Based on the metadata, ETL code is dynamically generated. This ETL code can ensure that all the right mappings happen at each layer to pull in all the right information (language, list of values, etc.). In one example, eye color may be added to the data warehouse; however, the language may be Japanese (e.g., with eye color options of blue, green, black, brown, etc.). Therefore, the metadata may be propagated to the data warehouse, and an ETL script may be generated to map the entire end-to-end system so that the user can report on how many promotions were clicked by users with the eye color "green," or some other color. While the disclosure describes use of ETL tools and ETL code, any type of loading and/or adapter tools may be utilized (including ELT or the like) for loading the data into the columns. In other words, the system is tool agnostic. For example, the code that is dynamically generated based at least in part on the metadata may be ELT code. Thus, as used herein, "ETL" can be replaced with "ELT" in all instances without deviating from the intent of the disclosure.

The techniques described above and below may be implemented in a number of ways and in a number of contexts. Several example implementations and contexts are provided with reference to the following figures, as described below in more detail. However, the following implementations and contexts are but a few of many.

In some examples, custom fields from source systems (on-premise or in the cloud) may be propagated to the central cloud service that represents a data warehouse and/or reporting system. As noted, a fixed number of custom columns may be added in the data warehouse during initial deployment. This imposes further challenges—e.g. support for different data types like Numeric, Character, or Date, and support for end-user specific metadata for the custom fields like the label, language, and list of supported values. Doing this requires a dynamic intelligence in the workflows since end-users (or their IT representative) do not have the ability to configure and change the data warehouse.

Some companies have various cloud services for Sales, Service, Human Capital Management and Talent, and on-premise enterprise systems like Fusion, Enterprise Business Systems (EBS), PeopleSoft, or JDE. Some offer Enterprise Business Intelligence Application services in the cloud that deploy a data warehouse and reporting system.

In one non-limiting example, the extensible attributes with ETL may be utilized to add a customer eye color. In some examples, the source information has eye color information added by the customer. A party.mdcsv file may be created that includes customer information (metadata). The file is called "Party" and it includes an attribute call "Eye" with a type of "varchar." Here, the source data may be extracted for each customer, where each customer is identified by a customer number (e.g., 1001, 1002, 1003, etc.), and each customer may be associated with a particular value (e.g., 10, 20, 30, respectively). The source label may be a descriptive label. In some examples, based on the local ID of the customer, each key may map to the same color, but in a different language. For example, if the customer's settings indicate that their language is English, then each key will map to the English versions for those colors: 10="Blue," 20="Brown," and 30="Black." However, if the user's ID indicates that they speak Japanese, the respective colors for Blue, Brown, and Black will be listed with Japanese characters that translate to the appropriate color that matches the key. For example, in Japanese 10="青."

Additionally, in some aspects, an extension component may be configured to hide the extra columns of the data warehouse within the data model when those columns are not in use. If a customer adds a new column, the extension component is configured to make the data model that includes the new custom columns visible to the customer. This is performed after the mapping. To utilize the system, customers do not need to write any new code or intentionally configure (or attempt to change) the data warehouse model. Instead, the customer can merely add new attributes at the source, and when the software and data warehouse identifies the new attributes in the source, the new data can be extracted, mapped, and added to the new extensible columns of the data warehouse.

However, in some examples, the customer may need to identify in the source system that they intend to add a new tag or column (e.g., eye color), and they can include the metadata that describes the new tag (e.g., how many characters, what type of data, what languages will be supported, etc.). Still, on the warehouse side, the customer need not set up anything or request any changes to the data warehouse. However, the customer may need to set this up on the source side. As each customer adds new columns, the data warehouse columns will be filled in with customer-configured and customer-specific data for those columns. The master table will include customer-specific columns for all different customers. However, when each customer runs a report, they will only be provided with data from their customized columns (and/or from their initial columns that are standard across all customers). In this way, the table is implemented as a multi-tenant table, and each customer only receives their appropriate data from the master table (e.g., isolation is implemented to keep the rows from getting mixed up between customer).

However, in other examples, each implementation (and, thus, each table) is implemented on a different virtual machine for each customer. Each customer may have multiple data sources. Thus, at each virtual machine, the tables may have the same columns once added (e.g., "extn_attrb_char_001"); however, for each customer (and each virtual machine) different data may be stored in those columns (e.g., for one customer that new column may store eye color, while for another customer it might store sock color).

In some examples, the mapping of attributes may be performed by an auto-allocation engine. Further, as described herein, an extension may be attribute that is dynamic and can hold anything. For example, an extension may act as a placeholder that can hold "eye color" or "product color" or "ID number," which are all attributes. As such, the auto-allocation engine may be configured to read incoming attributes. Based at least in part on the data set, the engine may determine the next available attribute, and assign the incoming data to that. There are some nuances, where the engine can have the same attribute that can be semantically equivalent across two different sources, so you can tag them and the allocation engine will allocate them to the same column (e.g., because they mean the same thing). For example, if two different customers add the same or similar new tag (columns), the system may be able to use a single new column for both customers. Additionally, a user may define or tag attributes that are semantically equivalent, so the mapping can be allocated based at least in part on the user-provided tags as well.

This helps to ensure that the engine is not creating multiple columns for the same attribute when only one is needed. For example, two different countries have the same attribute, that are semantically equivalent, but use different terms or languages, and the allocation engine can determine that they belong in the same column. Some sort of token can indicate that they are the same. In addition, the engine can allocate them to the same target column. Additionally, the engine can take each source column and allocate it to an available warehouse attribute. However, different languages are actually handled by description information. Some columns may have a description. The rendering module or reporting engine may have the ability to extract label as well as list of values. Therefore, when the label is extracted, it can do a language translation at the BI level. The data is stored as code and then extracted, and when rendered, it will be rendered in the user's language.

Further, in some examples, change management may be implemented such that new columns and/or new data can be received during runtime, and integrated into the warehouse seamlessly. For example, a customer can map an initial set of columns. In addition, the system can be up and running for some time. If customer decides they want to add more columns (adding new piece or analyzing new data), they can add the delta (e.g., add the new column) and keep everything else the same. A change management method will refresh the new columns alone, for all historical rows as well as new rows being added. In some cases, the system is able to manage the additions/removal/modification along the lifecycle seamlessly, like it was there from the beginning.

In some examples, columns for existing rows are updated without modifying the existing data. For example, if a customer adds a new attribute. Those attributes alone may be refreshed for all the past data and continue picking up as the system goes along in the next run. There is no need to refresh the entire system, just the new data.

FIG. 1 depicts a simplified example system or architecture 100 in which techniques for extensible attributes within ETL may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of archived relations, configurable data windows associated with archived relations, and/or accurately counting change events associated with managing archived relations described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a dynamic ETL module 148 and an extensible attributes module 150. In some cases, the extensible attributes module 150 may be configured to implement the auto-allocation engine described above. The dynamic ETL module 148 may be configured to implement a knowledge module for generating dynamic ETL code that implements the auto-allocation engine and/or manages the attribute mapping. As used herein, modules may refer to programming modules executed by servers or clusters of servers that are part of a service. In this particular context, the modules may be executed by the servers or clusters of servers that are part of the service provider computers 106.

Figure 2:
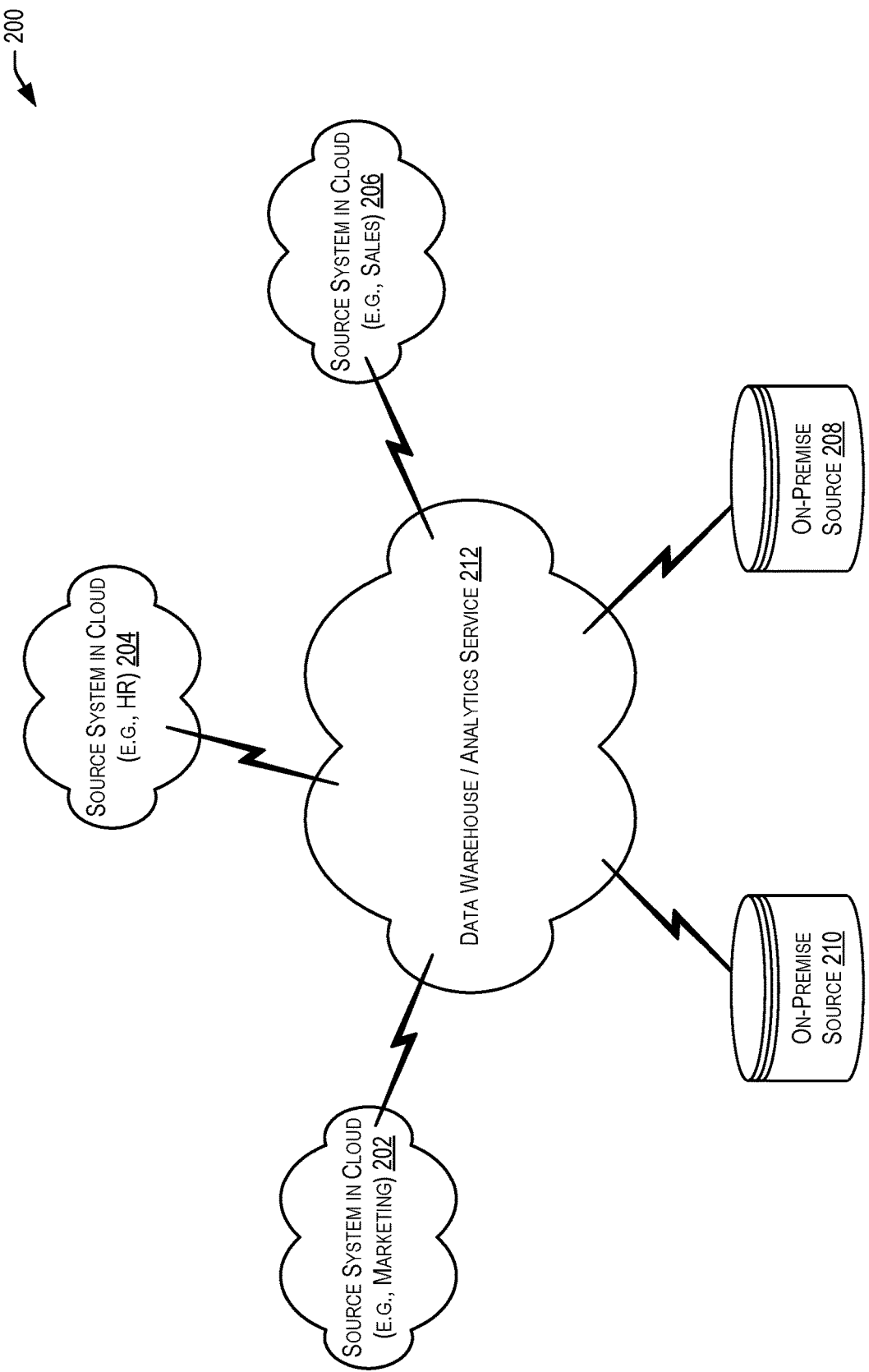
FIG. 2 is another simplified block diagram illustrating at least some additional examples techniques for implementing the features described herein, according to at least one example.

FIG. 2 illustrates a high level architecture 200 for implementing the extensible attributes described herein. Custom fields from source systems 202, 204, 206, 208, 210 (e.g., on-premise sources and/or in the cloud sources) need to be propagated to the central cloud service that represents the Data Warehouse/Reporting system 212.

As noted, a fixed number of custom columns may be added in the data warehouse 212 during initial deployment. This imposes further challenges—e.g. support for different data types like Numeric, Character, or Date, and support for end-user specific metadata for the custom fields like the label, language, and list of supported values. Doing this requires a dynamic intelligence in the workflows since end-users (or their IT representative) do not have the ability to configure and change the data warehouse 212.

FIG. 2 depicts a simplified high level diagram of an cloud system 200 that may incorporate an embodiment of the present disclosure. In some examples, a data warehouse/analytics service may be implemented in the cloud (e.g., as a set of networked computing devices providing one or more web services for customers). This data warehouse may be in communication with one or more other cloud services (e.g., third party services) such as, but not limited to, a cloud marketing service, a cloud human resources (HR) service, and/or a cloud sales service. Additionally, the data warehouse may also be in communication with one or more customer sources (e.g., the on-premise data sources). In some examples, each of the on-premise (customer) sources may only be capable of pulling their own (customer-specific) data. While the data warehouse may manage data for many different customers, the customer sources may only be able to access data specific to that customer.

The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 3:
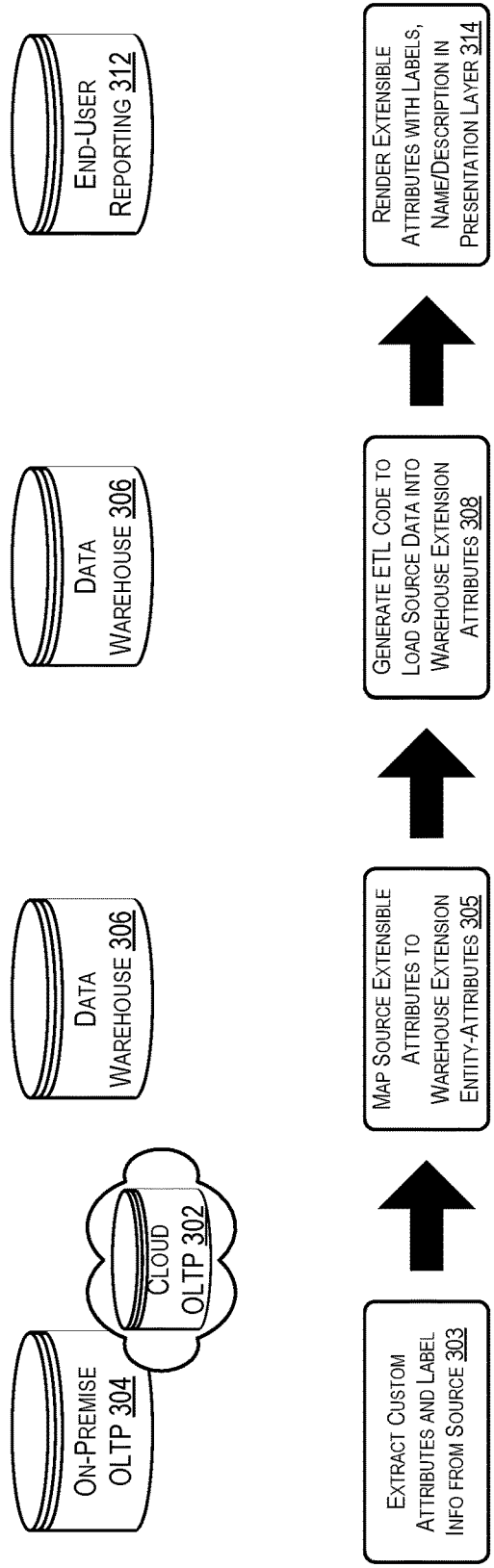
FIG. 3 is another simplified block diagram illustrating at least some additional examples techniques for implementing the features described herein, according to at least one example.

FIG. 3 depicts another simplified architecture 300 for describing features of the extensible attributes in ETL. As described briefly, instead of trying to adjust the source software in the cloud on the fly when a customer asks for a new attribute, the system can add a predefined number of fixed columns to the data warehouse (e.g., 500 extra columns or any number). Some may be reserved for different data types. Up front, before knowing what the customer may request, the fixed columns are defined and are capable of being configured upon request. Additionally, in the software, specific support for metadata may need to be added. For example, the software may need to know how to read a label, how to read a language, how to deal with unsupported values. Then, depending on what the customer decides to deploy, the system will be able to handle the new data. Once the customer defines the appropriate attributes, the data will be picked up and dynamic ETL will be generated to determine how to map the data to the fixed columns.

The reason this is capable without redeploying the software, is because of the fixed extra columns in the data warehouse. Then, the dynamically generated code will be capable of specifically mapping the new incoming data to one of the fixed columns independent of the type of data received. In some examples, a cloud Online Transaction Processing (OLTP) service 302 may be configured to extract 303 the custom attributes from the on-premise (customer-side) OLTP 304. Additionally, all of the metadata information about the attributes can be extracted from the on-premise OLTP 304 (e.g., the labels, etc. can be extracted). The extracted information will then be mapped 305 to a target (e.g., the data warehouse 306).

At the data warehouse 306, the extracted attributes can be mapped 305 to the fixed columns. For example, the source attributes can be mapped to the target model (configurable columns). The complexity will depend on the format of the extracted information in the extraction phase. Then, ETL code can be generated to load the source data into the extensible attribute (configurable) columns of the data warehouse. This is the dynamic code generation phase 308. The ETL code will be generated to move data from the source to the staging schema in the data warehouse. Additionally, the ETL code will be generated to move data from the staging schema to the dimensional tables in the data warehouse. Finally, when the customer requests a report via an end-user reporting system 312, the presentation layer has been fixed appropriately and the labels, etc. can be rendered 314.

In some examples, features of the extraction 303 may include extracting attributes and label information from sources (e.g., on-premise OLTP 304 or cloud sources). Features of the extraction 303 may also include formatting the extracted attributes to mirror the source model, the target model, or an intermediate model. Additionally, features of the extraction 303 may also include making the extracted attributes available to a staging environment. In some examples, the mapping 305 may include mapping source attributes to a target column of the target. The complexity may depend on the format of the extracted attributes. Some number of fixed columns may be located in the data warehouse 306. In some examples, features of the ETL code generation 308 may include generating the ETL code to move the data from the source to the staging schema in the warehouse 306. Additionally, the ETL code may be configured to move the data from the staging schema to dimensional tables in the data warehouse. Further, in some examples, features of the reporting 314 may include showing extensible attributes in a user's native language, showing the correct label for the extensible column in the presentation layer, and/or showing the correct list of values for the extensible column.

The following technical components may be used by a company or entity to implement the features of extensible attributes in ETL described herein:

- Fusion OLTP services are premier cloud based source transactional systems for Sales, Marketing, Human Capital Management, etc.
- RightNow is a service management cloud service
- The ETL technology is called ODI (Data Integrator) which has a metadata repository (called ODI repo in FIG. 10)
- OTBI (Transactional Business Intelligence) is a transactional reporting service which uses a BI Server called OBIEE
- Metadata component for holding the Business Intelligence logic including ETL logic is called RPD
- Metadata component for holding reports and layouts is called Webcat
- The Data Warehouse has a variety of components.
    - Entity seed data represents metadata that is persisted out-of-the box as part of the deployment with the source to target entity level mappings.
    - RKM stands for Reverse Engineering Knowledge Module—this is part of the ODI technology to write code for dynamic transformations of data and metadata.

Output of the extensibility logic is a layer called Source Dependent Extracts (SDE). This represents the ETL code that has been extended to load the custom columns into the data warehouse.

The ODI repo is the metadata repository for an ETL tool and it has all the logic needed for data movement and transformation for the custom columns to be loaded into the warehouse.

Figure 4:
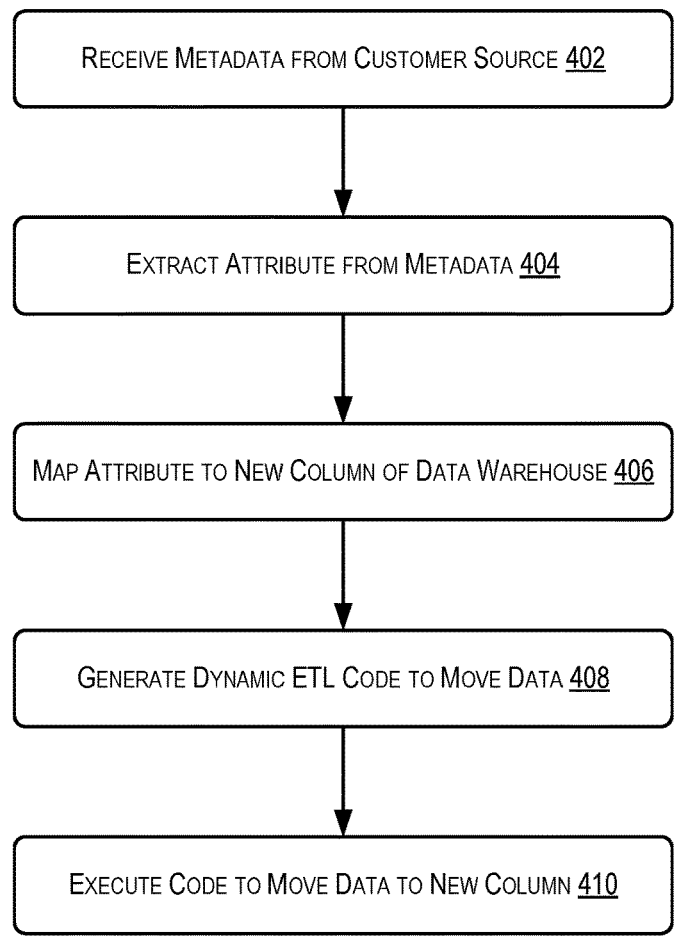
FIG. 4 is a simplified flow diagram illustrating an example process for implementing the features described herein, according to at least one example.
Figure 5:
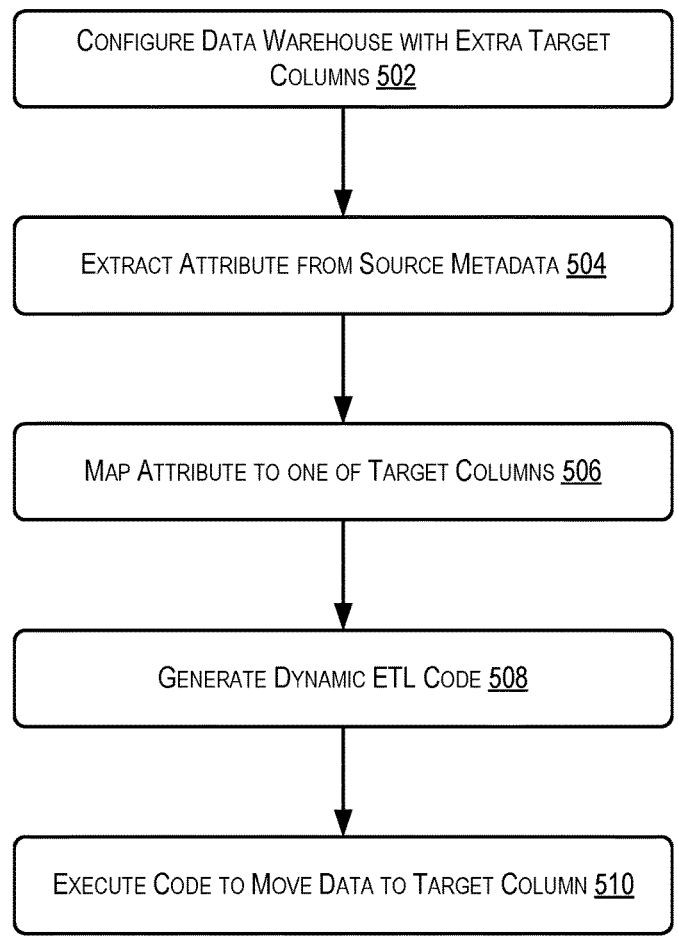
FIG. 5 is another simplified flow diagram illustrating an example process for implementing the features described herein, according to at least one example.

FIGS. 4 and 5 are flow diagrams of processes 400 and 500 for implementing an extensible attributes in ETL in accordance with at least some embodiments. These processes 400 and 500 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the dynamic ETL module 148 and/or the extensible attributes module 150 shown in FIG. 1) may perform the processes 400 and 500 of FIGS. 4 and 5, respectively. In FIG. 4 the process 400 may begin by receiving metadata from a customer source at 402. At 404, the process 400 may extract an attribute from the metadata. In some examples, the process 400 may map the attribute to a new column of a data warehouse at 406. At 408, the process 400 may generate dynamic ETL code to move the data to the new column. Finally, the process 400 may end at 410, where code to move the data to the new column may be implemented.

In some examples, the one or more service provider computers 106 (e.g., utilizing at least the dynamic ETL module 148 and/or the extensible attributes module 150 shown in FIG. 1) may perform the processes 500 of FIG. 5. In FIG. 5 the process 500 may begin by configuring a data warehouse with extra target columns at 502. In some examples, the process 500 may extract an attribute from source metadata at 504. At 506, the process 500 may map the attribute to one of the extra target columns. At 508, the process 500 generate dynamic ETL code. Further, the process 500 may end at 510, where the code to move the data to the target column may be executed.

Illustrative methods and systems for implementing extensible attributes in ETL are described above. Some or all of these systems and methods may, but need not, be implemented at least partially by architectures and processes such as those shown at least in FIGS. 1-5 above.

Figure 6:
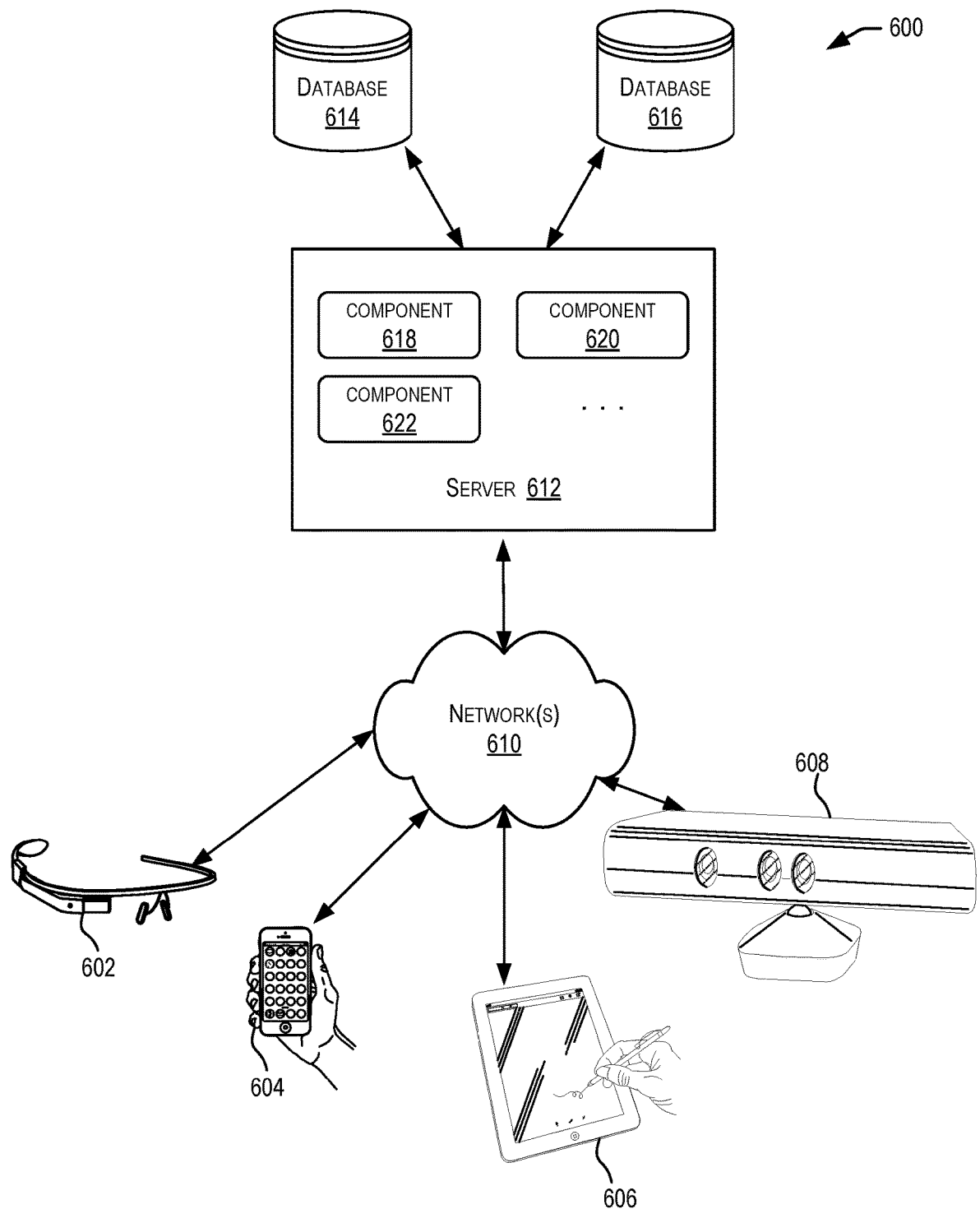
FIG. 6 is another simplified block diagram illustrating at least some additional examples techniques for implementing the features described herein, according to at least one example.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 602.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
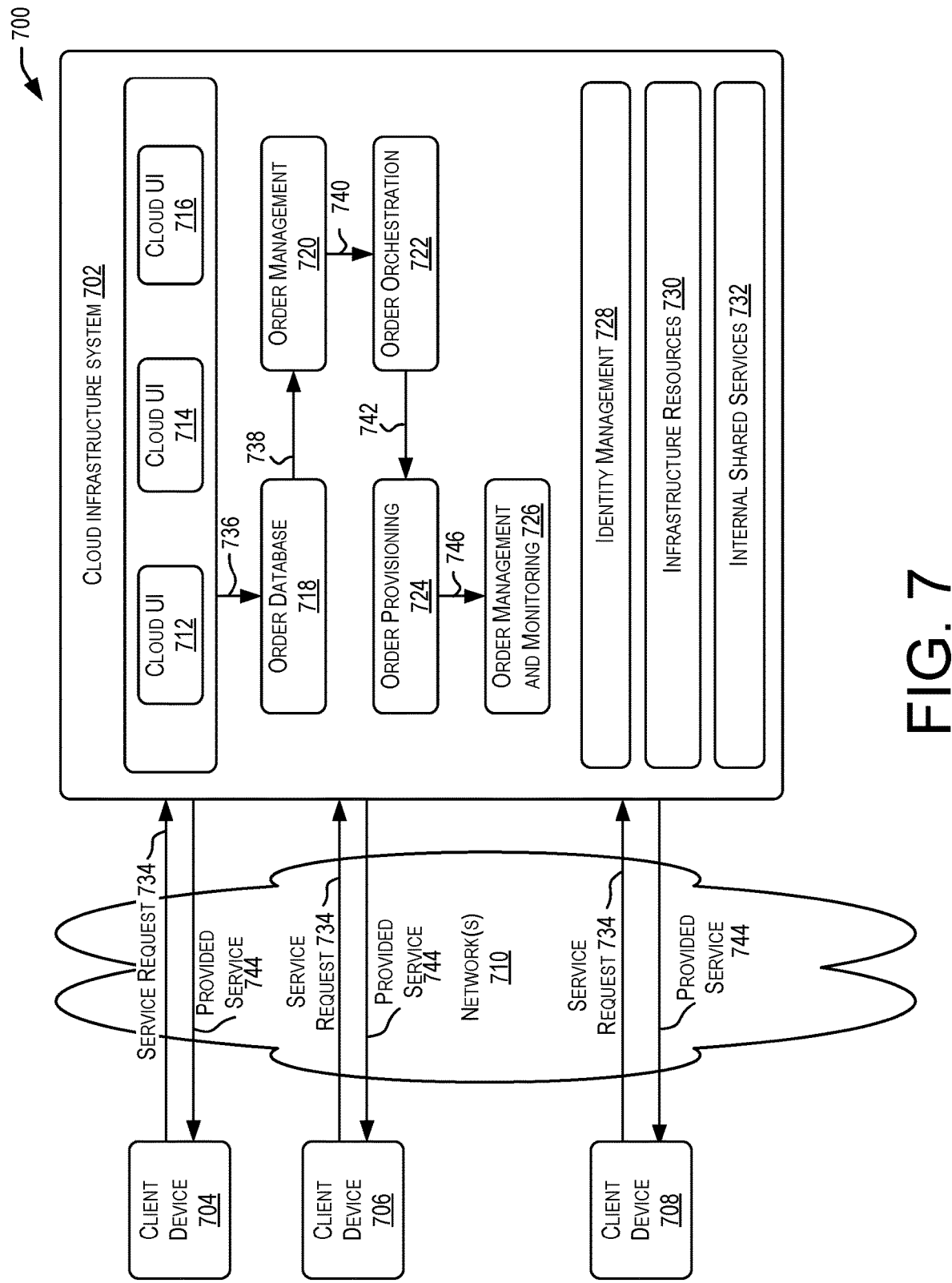
FIG. 7 is another simplified block diagram illustrating at least some additional examples techniques for implementing the features described herein, according to at least one example.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the disclosure. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.)

Identity management module 728 may also include the management of descriptive information about each customer and about how and by whom that descriptive information can be accessed and modified.

Figure 8:
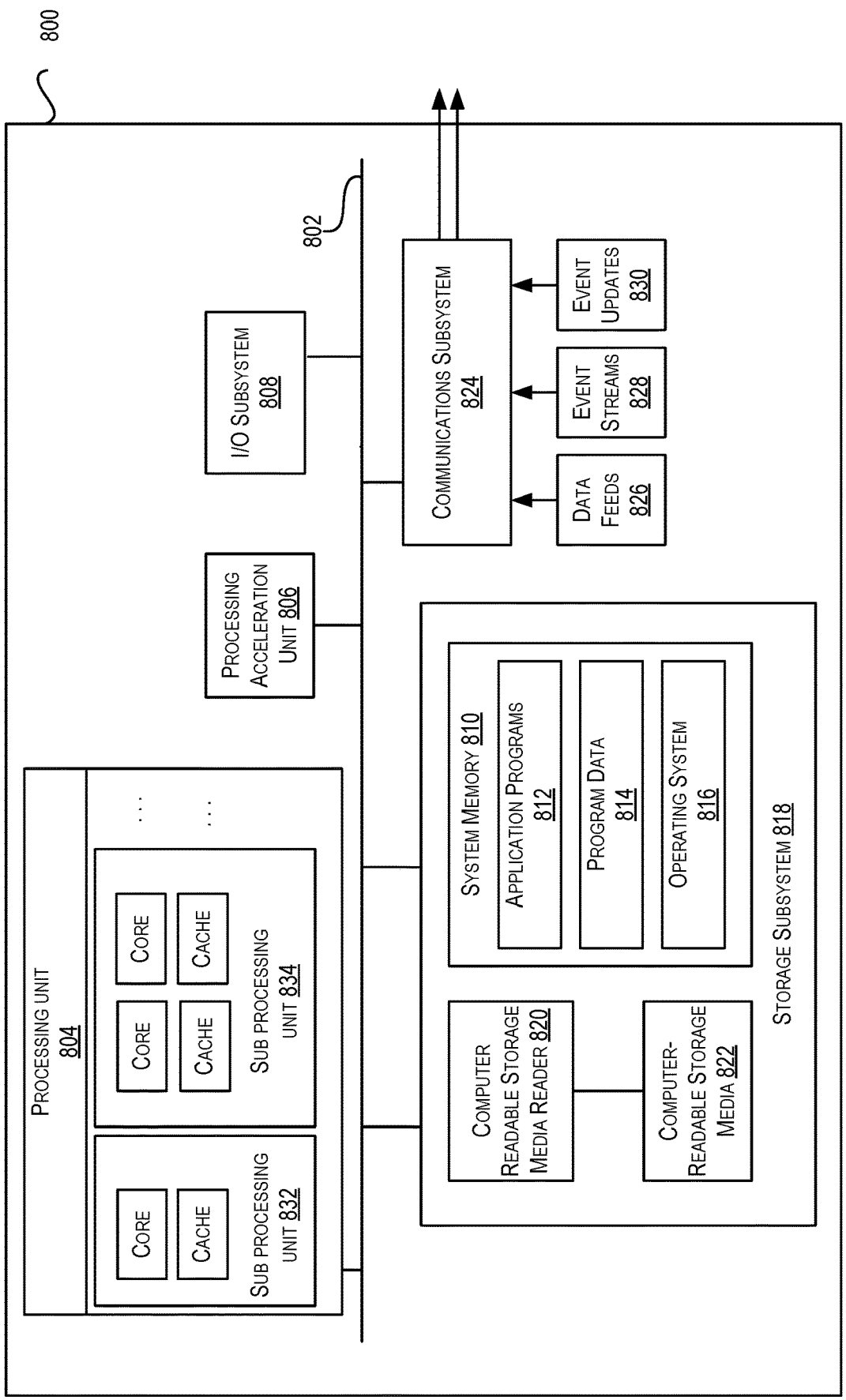
FIG. 8 is another simplified block diagram illustrating at least some additional examples techniques for implementing the features described herein, according to at least one example.

FIG. 8 illustrates an exemplary computer system 800, in which various embodiments of the present disclosure may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Some companies have various cloud services for Sales, Service, Human Capital Management and Talent, and on-premise enterprise systems like Fusion, Enterprise Business Systems (EBS), PeopleSoft or JDE. Some offer Enterprise Business Intelligence Application services in the cloud that deploy a data warehouse and reporting system.

Figure 9:
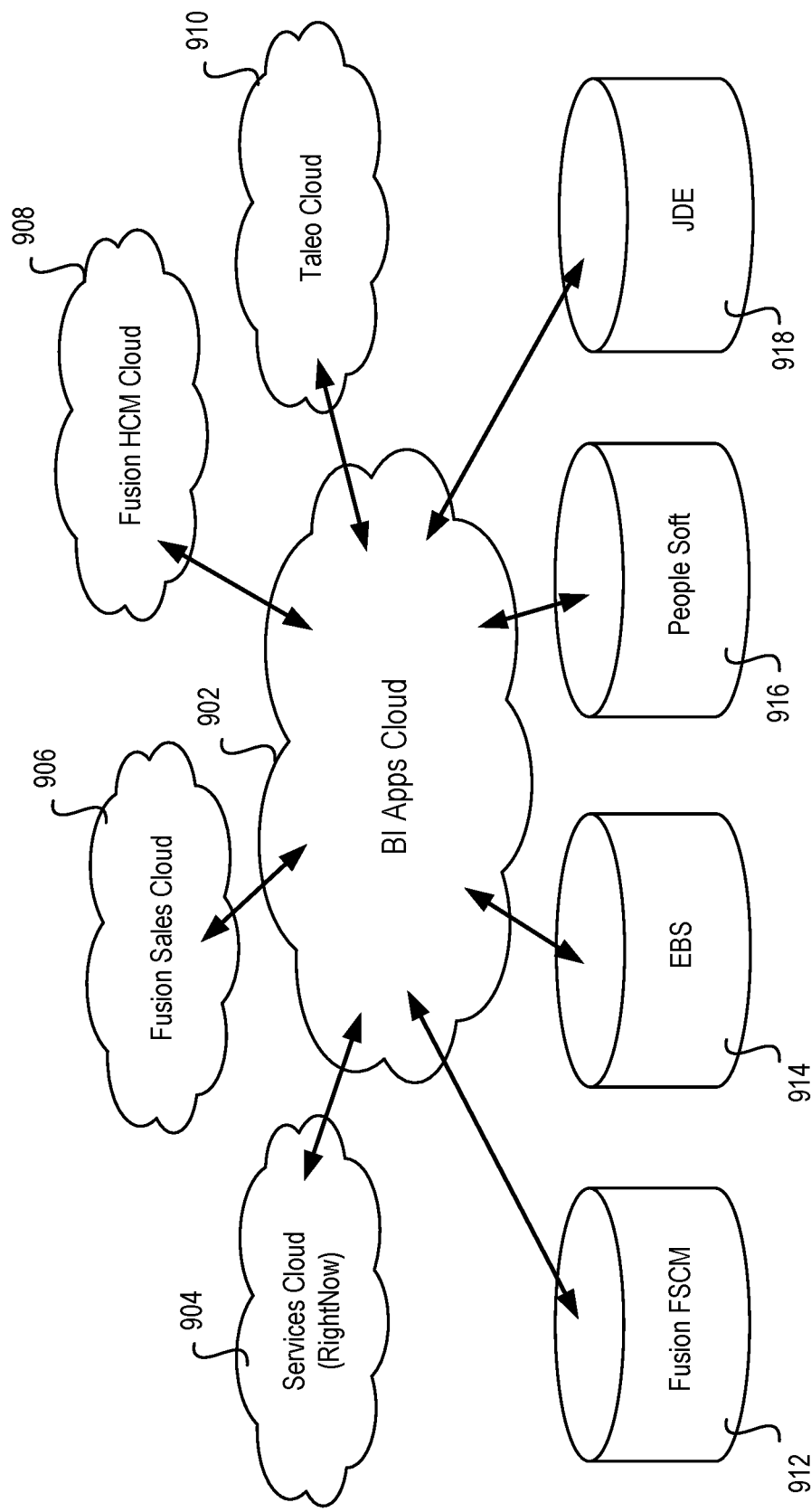
FIG. 9 is another simplified block diagram illustrating at least some additional examples techniques for implementing the features described herein, according to at least one example.

FIG. 9 depicts some specific cloud services and cloud targets that can be utilized to implement the features described herein. For example, a Business Intelligence Applications (BI Apps) Cloud 902 can be configured to provide access of one or more targets (e.g., storage services, storage locations, etc.) to one or more services. Example services include a Web Services cloud service 904 (e.g., RightNow Adapter or other cloud service), a sales cloud service 906 (e.g., Fusion Sales Cloud), a Human Capital Management cloud service 908 (e.g., Fusion HCM Cloud), and/or other cloud services 910 (e.g., Taleo Cloud). Additionally, example targets include a Supply Chain Management (SCM) target 912 (e.g., Fusion SCM), a block storage target 914 (e.g., elastic block storage targets), an HCM target 916 (e.g., PeopleSoft), and/or other enterprise targets 918 (e.g., JD Edwards Enterprise One or the like).

Figure 10:
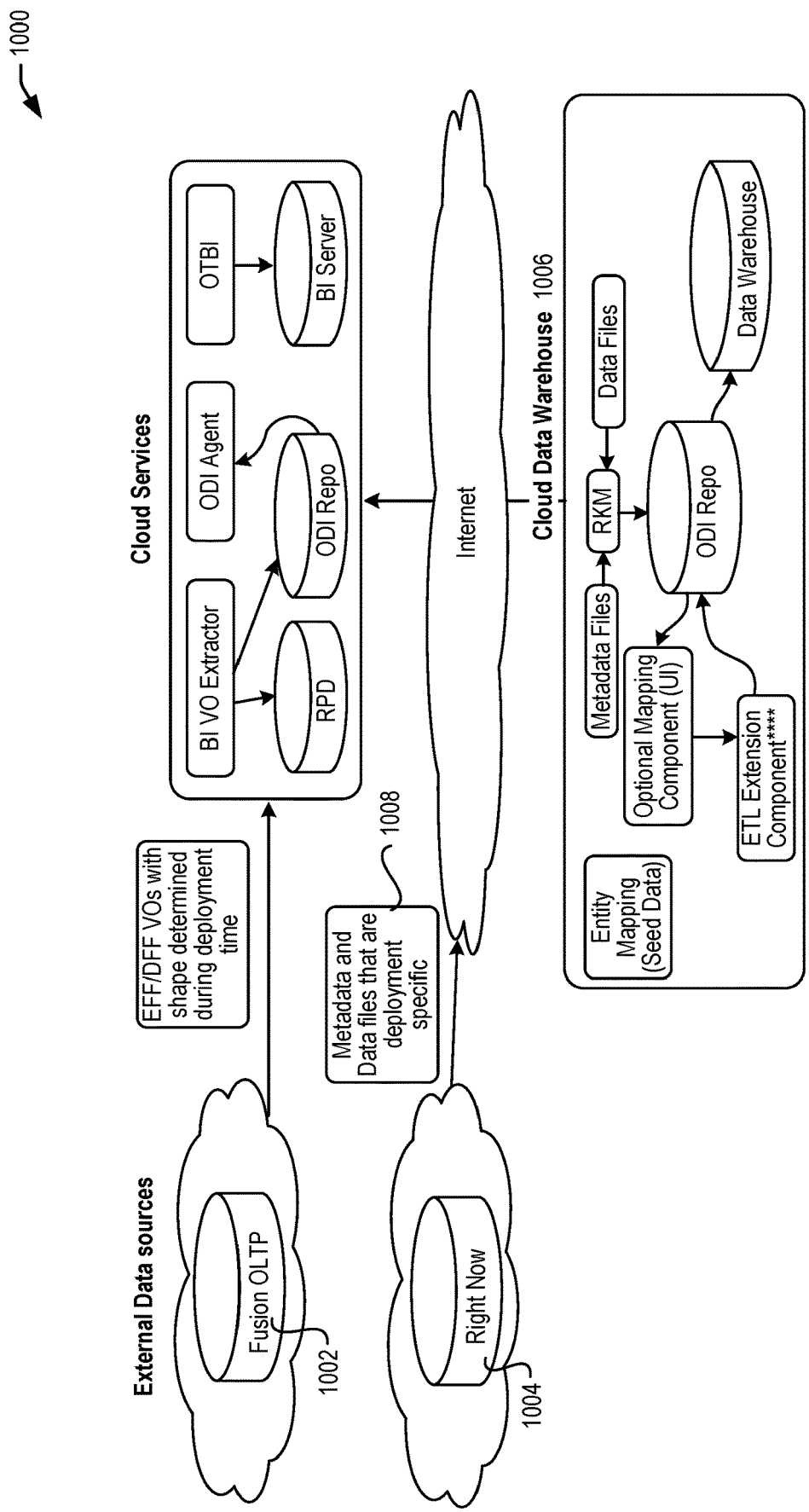
FIG. 10 is another simplified block diagram illustrating at least some additional examples techniques for implementing the features described herein, according to at least one example.

FIG. 10 illustrates architecture 1000 that depicts some additional cloud services that can be utilized to implement some of the features described herein. For example, external data sources such as Fusion Online Transaction Processing (OLTP) software 1002 and/or RightNow 1004 can be implemented in the cloud. Additionally, in some examples, the Cloud Data Warehouse 1006 may also be implemented in the cloud. In some examples, there is metadata 1008 and other data that can be extracted over the cloud.

Fusion OLTP services are premier cloud based source transactional systems for Sales, Marketing, Human Capital Management, etc.

RightNow is a service management cloud service.

The ETL technology is called ODI (Data Integrator) which has a metadata repository (called ODI repo in FIG. 10)

OTBI (Transactional Business Intelligence) is a transactional reporting service which uses a BI Server called OBIEE Metadata component for holding the Business Intelligence logic including ETL logic is called RPD Metadata component for holding reports and layouts is called Webcat The Data Warehouse has a variety of components.

Entity seed data represents metadata that is persisted out-of-the box as part of the deployment with the source to target entity level mappings.

RKM stands for Reverse Engineering Knowledge Module—this is part of the ODI technology to write code for dynamic transformations of data and metadata.

Output of the extensibility logic is a layer called Source Dependent Extracts (SDE). This represents the ETL code that has been extended to load the custom columns into the data warehouse.

The ODI repo is the metadata repository for an ETL tool and it has all the logic needed for data movement and transformation for the custom columns to be loaded into the warehouse.

Figure 11:
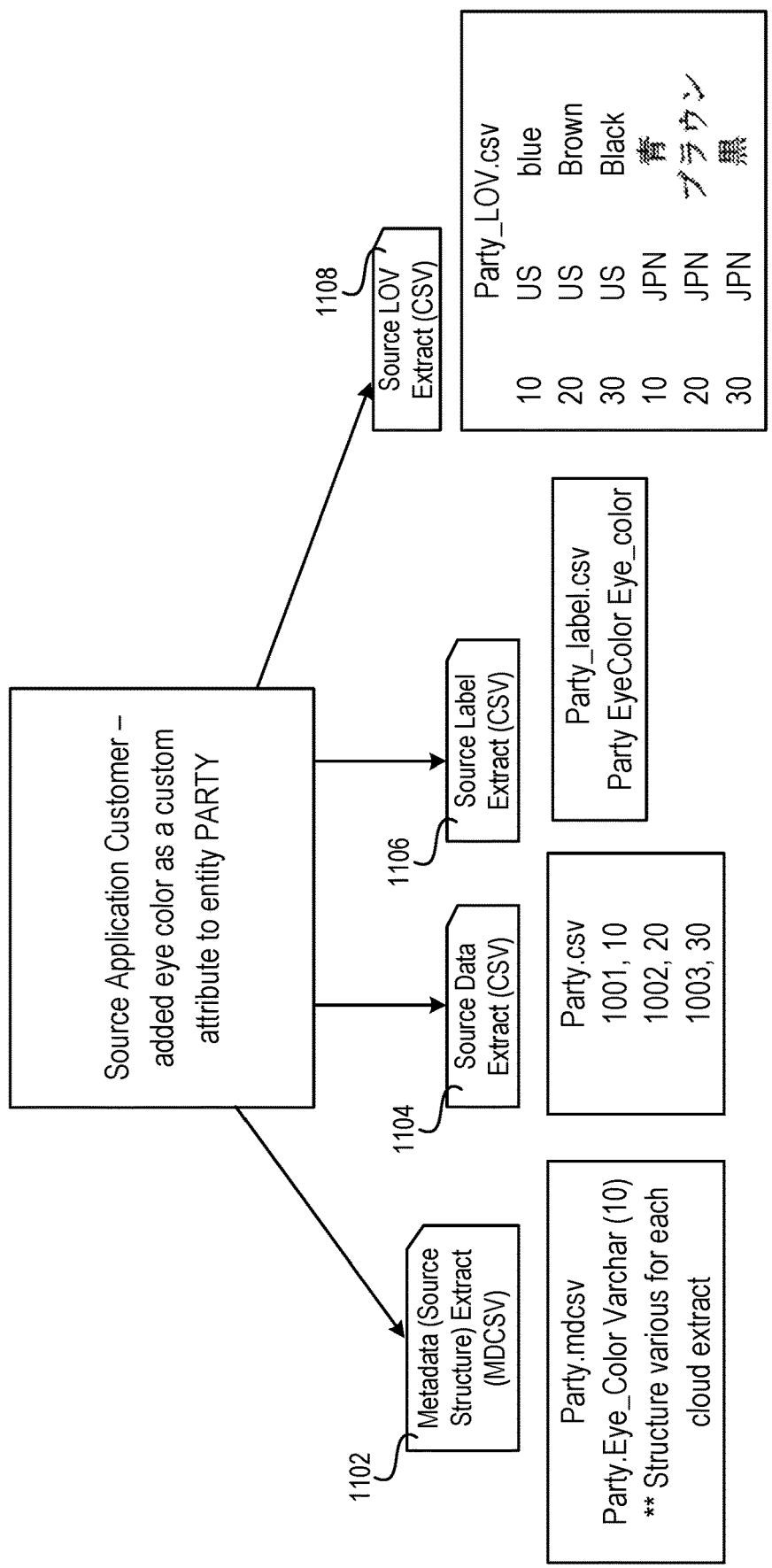
FIG. 11 is another simplified block diagram illustrating at least some additional examples techniques for implementing the features described herein, according to at least one example.

FIG. 11 depicts one example for utilizing extensible attributes with ETL to add a customer eye color. FIG. 11 shows example of how the custom attribute added by a customer on the source system (e.g. Customer Eye Color) and its associated metadata like label, language and list of values can be captured in extract files. In some examples, the source information has eye color information added by the customer. A party.mdcsv file may be created that includes customer information (metadata). The file is called "Party" and it includes an attribute call "Eye" with an a type of "varchar." Here, the source data may be extracted for each customer, where each customer is identified by a customer number (e.g., 1001, 1002, 1003, etc.), and each customer may be associated with a particular value (e.g., 10, 20, 30, respectively). The source label may be a descriptive label. In some examples, based on the local ID of the customer, each key may map to the same color, but in a different language. For example, if the customer's settings indicate that their language is English, then each key will map to the English versions for those colors: 10="Blue," 20="Brown," and 30="Black." However, if the user's ID indicates that they speak Japanese, the respective colors for Blue, Brown, and Black will be listed with Japanese characters that translate to the appropriate color that matches the key. For example 10="Blue"="青."

In some examples, when it comes to report systems and data warehousing, there are source systems like a CRN system or an HR system. Imagine a customer adds a new field on the source side (e.g., eye color). For example, consider that a developer (customer) is running a promotion where, depending on the user's eye color, the customer might offer some promotion. Now, on the report, the customer might want to see data associated with eye color. For example, how many people clicked on something, or how many people bought something (with a particular eye color). May want to report based on the new attribute.

However, in general data warehouse systems, most elements are very fixed in nature. Some fields might have a number or a Variable Character Field (varchar), it might have particular language or other list of values, it might have defined characteristics that are fixed. Developers then typically hard-wire these attributes into a large data warehouse, and then write up the logic to aggregate information based on certain dimensions, facts, etc. Then, at the data warehouse system, a report may be run based on that new attribute.

Generally, developers typically need to make requests to IT or other developers to add new attributes. The developers may then need to manually add the new attribute (e.g., eye color) for the system based on the particular request. However, this is not scalable in the cloud and as systems move to the cloud, adding new attributes becomes more challenging. For example, a cloud service may have thousands of customers, with potentially thousands of attributes, where it may be too difficult to change systems that are deployed for multiple users because, in some cases, a single system may be deployed on various different virtual processors (nodes) for multiple different customers (e.g., for each customer, a separate instance of the same system may be deployed on a different virtual machine).

In some examples, a certain number of columns in the data warehouse are selected for potential future customization (e.g., they are added and reserved). For example, some number (e.g., 50) may be reserved for numeric attributes and some other number (e.g., 20, 50 or 100) may be reserved for varchar. Once reserved, and a customer customizes (adds) a column for their deployment, the system must execute a dynamic mapping to the warehouse where the columns have been reserved. In some examples, ETL code (scripts) may be dynamically generated at every layer. For example, at every layer it must be determined whether the right language is being brought in, whether the right list of values is brought in, whether the right information is being provided to the report layer, the presentation layer, etc.

In some examples, when a customer enters some information to add a new column, some metadata is created. This metadata may be collected by the system and propagated into the data warehouse. Based on the metadata, ETL code is dynamically generated. This ETL code can ensure that all the right mappings happen at each layer to pull in all the right information (language, list of values, etc.). In one example, eye color may be added to the data warehouse; however, the language may be Japanese (e.g., with eye color options of blue, black, and brown). So, the metadata may be propagated to the data warehouse, and an ETL script may be generated to map the entire end-to-end system so that the user can report on how many promotions were clicked by users with the eye color "green," or some other color.

In one example, a new attribute "eye color" may be added. The metadata may be extracted at Source Structure Extract 1102. "Varchar(10) may be extracted, and this may indicate the new attribute being added. Then, the system may get the actual data from Source Data Extract 1104. Next, the user facing label may need to be extracted at Source Label Extract 1106. This label can indicate what the label will look like on the screen. As noted, this label can be extracted in multiple different languages and then rendered in the customer's language. Next, the system will need to extract the list of values (LOV) at Source LOV Extract 1108. This LOV can provide a mapping from the source data that was extracted at 1104 to the translated name of the actual data.

Figure 12:
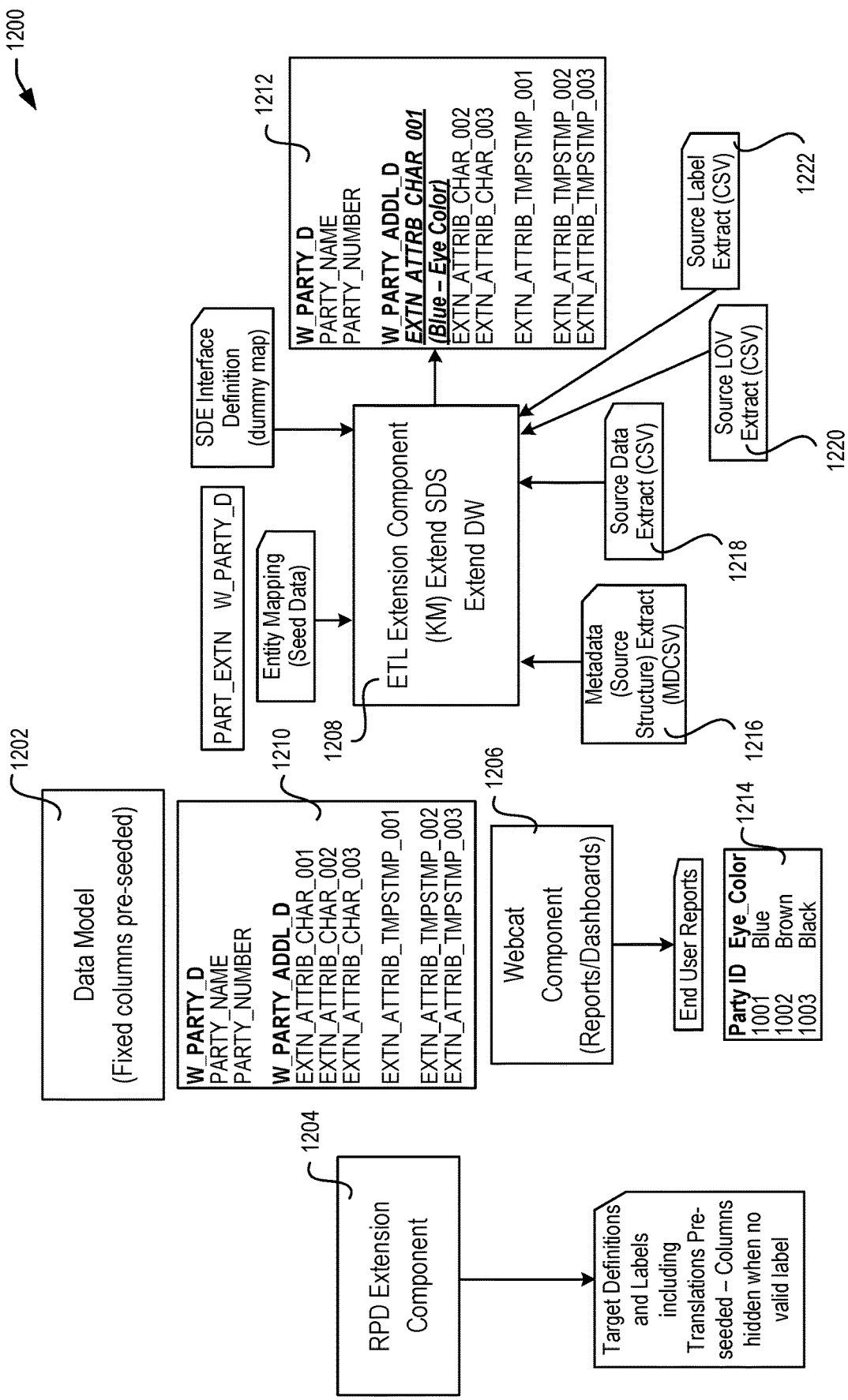
FIG. 12 is another simplified block diagram illustrating at least some additional examples techniques for implementing the features described herein, according to at least one example.

FIG. 12 depicts additional examples and features for implementing the extensible attributes in ETL described herein. Specifically, FIG. 12 shows an example of how the custom attribute added by a customer gets mapped on the Data Warehouse side in the different parts of the workflow like data model, transformation and reporting layer.

In some aspects, an RPD extension component may be configured to hide the extra columns of the data warehouse within the data model when those columns are not in use. If a customer adds a new column, the RPD extension component is configured to make the data model that includes the new custom columns visible to the customer. This is performed after the mapping described earlier. To utilize the system, customers don't need to write any new code or intentionally configure (or attempt to change) the data warehouse model. Instead, the customer can merely add new attributes at the source, and when the software and data warehouse identifies the new attributes in the source, new data can be extracted, mapped, and added to the new extensible columns of the data warehouse.

However, in some examples, the customer may need to identify in the source system that they intend to add a new tag or column (e.g., eye color), and they can include the metadata that describes the new tag (e.g., how many characters, what type of data, what languages will be supported, etc.). Still, on the warehouse side, the customer need not set up anything or request any changes to the data warehouse. However, the customer may need to set this up on the source side. As each customer adds new columns, the data warehouse columns will be filled in with customer-configured and customer-specific data for those columns. The master table will include customer-specific columns for all different customers. However, when each customer runs a report, they will only be provided with data from their customized columns (and/or from their initial columns that are standard across all customers). In this way, the table is implemented as a multi-tenant table, and each customer only receives their appropriate data from the master table (e.g., isolation is implemented to keep the rows from getting mixed up between customer.

However, in other examples, each implementation (and, thus, each table) is implemented on a different virtual machine for each customer. Each customer may have multiple data sources. Thus, at each virtual machine, the tables may have the same columns once added (e.g., "extn_attrb_char_001"—see, FIG. 12); however, for each customer (and each virtual machine) different data may be stored in those columns (e.g., for one customer that new column may store eye color, while for another customer it might store sock color). In some examples, if two different customers add the same or similar new tag (columns), the system may be able to use a single new column for both customers.

In some examples, the architecture 1200 of FIG. 12 may include a Data Model component 1202, a BI Repository (RPD) Extension Component 1204, a Webcat Component 1206, and an ETL Extension Component (e.g., a Knowledge Model (KM)) 1208. The RPD Extension Component 1204 may include the BI metadata while the Webcat Component 1206 contains the metadata for reports and dashboards. In some cases, the ETL Extension Component 1208 contains the ETL metadata. In some examples, a present number of fixed columns can be pre-seeded. At runtime, the customer can add a custom attribute, and the extracts will run. The extracts will extract the metadata and the data (as described above) and will load the metadata and the data into the ETL Extension Component 1208. The ETL Extension Component 1208 can be configured to extend the staging model, the data warehouse model, and/or source dependent schema model.

Using the initial data 1210, that lists "EXTN_ATTRIB_CHAR_001," it can be seen that the auto-allocation engine can generate an extended set of data 1212 that lists the extended attribute "EXTN_ATTRIB_CHAR_001 (Blue Eye-Color)." The initial data 1210 is the pre-seeded target columns, and they can either be on an additional extension table (e.g., "W_PARTY_ADDL_D") or on the base extension table (e.g., "W_PARTY_D"). The auto-allocation engine can allocate the columns that are actually deployed on each customer's site. Note, this is not a development time metadata, it is deployment time metadata. The auto-allocation engine maps the out-of-box "EXTN_ATTRIB_CHAR_001" to "Eye Color." In some examples, the auto-allocation engine is configured to be implemented as part of the ETL Extension Component 1208. In some examples, the allocation information is stored in the metadata.

In some examples, a metadata model (e.g., a Flex Metadata Model) sits in the data warehouse 1006 of FIG. 10, and is part of the data warehouse model. In the end, the end user reports 1214 are going to be generated, and will be configured to display the actual label (e.g., "Blue," "Brown," etc.) and the actual values for each of the parties. Thus, the new attributes and columns can be displayed on the reports and dashboards of the user (customer) without requiring the user to get IT involved and/or to manually customize the application. In some cases, their will be predefined target columns; however, the source columns will not be known until deployment time. At deployment time, the source columns can be identified by the metadata extracts that are performed (e.g., metadata extract 1216, source data extract 1218, source LOV extract 1220, and source label extract 1222). There may also be some seeded metadata that identifies high level and/or entity-level mappings that indicate what data might go with which parties. In some examples, the knowledge module (KM) of the ETL Extension Component 1208 has the intelligence to generate the runtime code. The runtime code (e.g., including the transformation expression) may be generated based at least in part on the extracted metadata. The transformation expression may configure the runtime code to perform the ETL or ELT process.

Figure 13:
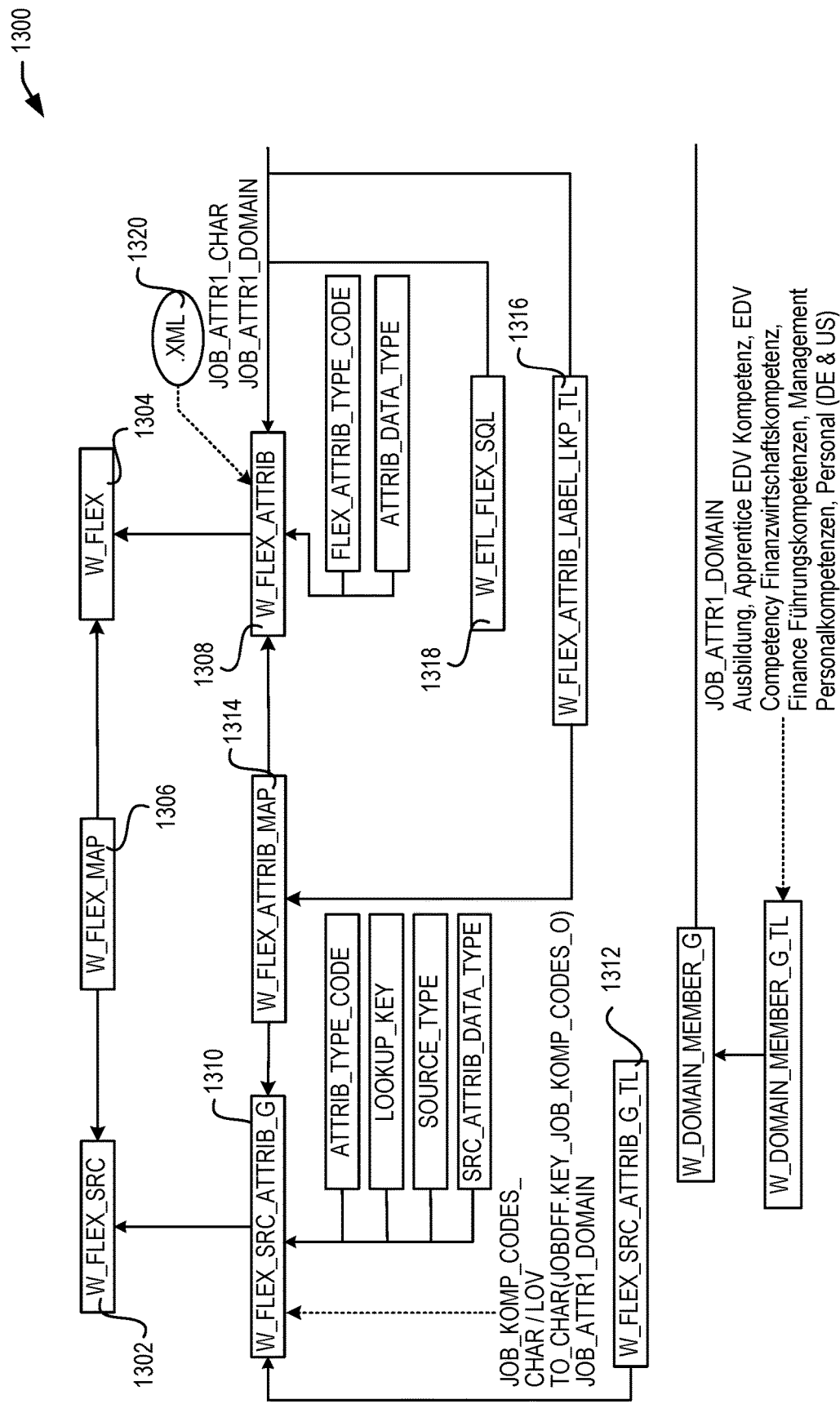
FIG. 13 is another simplified block diagram illustrating at least some additional examples techniques for implementing the features described herein, according to at least one example.

FIG. 13 illustrates architecture 1300 for implementing the BI Flex model that enables enterprise customers to add custom fields to their source applications, and then subsequently report on metrics by those custom fields. In the conventional, on-premise environment, an IT department would modify the data warehouse model, ETL, and reporting workflow. However, as source applications and data warehouses migrate to the cloud, there's no IT involvement, and it would be prohibitively expensive to add new fields, customize the data model, ETL, and reporting workflows, and then re-deploy all this to the cloud environment. The Extensibility feature described herein solve the above dilemma, by dynamically mapping metadata representing the labels, languages, and lists of supported values of custom fields, from the source application, to predefined reporting attributes of the target data warehouse, without any need to re-deploy this metadata to the cloud.

In some examples, the BI Flex model is a collection of metadata and Data Integrator (DI, e.g., Oracle Data Integrator (ODI)) procedures and tasks that automate the allocation (or mapping, or association) of source application flex columns with data warehouse master table generic target flex columns (sometimes referred to as BI Flex attributes). The BI Flex platform essentially manages the metadata describing the various source application and target flex columns, and attempts to be as dynamic and metadata drive as possible. In some cases, the BI Flex platform also creates new metadata which specifies the display labels (and their visibilities) for the mapped flex attributes, and SQL expressions for extracting flex data column values. This generated metadata can be used as inputs to the KM and RPD initialization processes, respectively.

In some examples, a BI domain is a subsystem architecture, consisting primarily of metadata tables, and standard access, mapping, and translation functions, for managing named collections of values. Used to provide a standard representation and management infrastructure for the various value sets or lists of values that might be obtained from multiple enterprise or source applications. The BI Domains architecture can be used to conform shared value domains across the data warehouse, by storing the conformed values, and providing standard mapping and translation functions between conformed domains and equivalent value sets or lists of values on the various source systems. Multiple Language Support (MLS) and localization within BI Applications, for example, is an important application of BI Domains.

In some examples, the general strategy is to include support for lists of values (LOVs), including the following:

BI Flex—Leverage BI Flex architecture for dynamic metadata management, and expand its functionality where necessary to support LOVs: allocate (map) extensible attributes and domain attributes representing LOVs, manage attribute labels and their visibility, and generate SQL text for extensible column value extraction, via the extensible KM.

BI Domains—Leverage BI Domains architecture for MLS, and to store LOVs as domains on the data warehouse side.

BI ETL—Leverage BI ETL architecture to move LOVs associated with allocated extensible attributes into BI Domains (LOVs are determined from source application value sets), move source label information into BI Flex, and move flex data into %_D or %_ADDL_D tables.

BI RPD—Pre-seed RPD with a fixed number of LOV logical columns/look_ups for BI Domains, obtain names and descriptions of LOV columns, initialize session variables with column names as look_up types, and use HIDIFF logic to display either the base column name, or LOV column name (if available), in the Presentation Layer.

Additionally, in some examples, there are at least four metadata elements of the BI Flex platform. Those elements may include, but are not limited to:

Flex Source Code—Identifies source flex columns within a data source that have common characteristics or properties that are descriptive of the source (essentially a label for source flex columns). For example:

PER_JOBS_DFF
Fusion | DFF | FLEX_BI_JobCustomerFlex_VI |
HCM_JO_FLX_B_JBCSTFLX_V902104 | JOBDFF BI Flex Code—Identifies generic target flex columns of a data warehouse dimension table (_D) or extension table (_ADDL) that likewise have common characteristics or properties that are descriptive of the target (also essentially a label for these target flex columns). For example:

JOB
DIM_ATTRIB
W_JOB_D
JOB_

Flex Mapping—Associates source flex codes with BI flex codes, by product line. For example: [source=PER_JOBS_DFF, target=JOB, product line=Fusion]

This relationship is what drives the BI Flex platform's auto allocation of source flex attributes to target flex attributes.

Essentially, the names of all source flex attributes (columns) are extracted from a data source, along with their corresponding source flex codes. This metadata is then downloaded from the cloud, and made available to the BI Flex platform.

The BI Flex auto allocation process will, for a given source flex attribute, obtain the BI flex code associated with the source attribute's source flex code (via the flex mapping), and then search for the next available (unallocated) target BI flex attribute (column) on the dimension master table or extension table, associated with the BI flex code, and of the same data type. When found, a new piece of metadata, representing the new source-target allocation, is created and Stored (more on this later).

Flex Attribute List—A master listing of all the generic, target flex attributes associated with a given BI flex code.

For a given BI flex code, and its associated data warehouse dimension master table CD) or extension table (_ADDL), the entries of this listing correspond one-to-one with the generic flex target columns defined by dimension master or extension table, and used for the actual storage within the data warehouse of the corresponding source flex attribute values from the source system.

Each entry of the flex attribute list is essentially a piece of metadata that describes a particular target flex column of the target data warehouse table. For example: JOB|JOB_ATTR1_CHAR|CHAR|VARCHAR2| etc.

In some examples, the BI Flex platform metadata can be stored at runtime in a collection of source-independent BI applications platform data warehouse tables. For example, "W_FLEX_SRC" 1302 can store the source flex codes and their source-specific properties. In some examples, "W_FLEX" 1304 can store the target flex codes and their target-specific properties. Additionally, "W_FLEX_MAP" 1306 can store the source flex code-target flex code mappings. Further, in some examples, "W_FLEX_ATTRIB" 1308 can store the definitions of all the target flex attributes, per target flex code and data warehouse dimension master table (_D) or extension table (_ADDL_D).

Additionally, "W_FLEX_SRC_ATTRIB_G" 1310 can store the source flex attribute definitions downloaded from the source applications. "W_FLEX_SRC_ATTRIB_G_TL" 1312 can store the localized source flex attribute labels and descriptions downloaded from the source applications. In some instances, "W_FLEX_ATTRIB_MAP" 1314 can store the dynamically created source-target mappings between the source flex attributes of the application, and the generic, target extensible attributes of the data warehouse master tables (e.g., %_D or %_ADDL_D). "W_FLEX_ATTRIB_LABEL_LKP_TL" 1316 can store localized labels and descriptions of the mapped extensible attributes and their visibility for display by the RPD. Further, in some cases, "W_ETL_FLEX_SQL" 1318 can store SQL fragments leveraged by the extensible KM in extracting and loading extensible attribute column values from the source and loading them into the data warehouse target tables (%_D or %_ADDL_D).

In some examples, each of the four high level BI Flex metadata tables can be initially "seeded" with pre-defined metadata content. This metadata can come from XML files 1320 specific to supported product areas, and this fact is reflected in each XML file's 1320 name. The programmatic tasks of the BI Flex platform can consist of a number of DI procedures and mappings that can be defined within the BI Applications Main Development Repository, including:

Metadata loader procedures/scenarios—these load the pre-defined BI flex metadata from the XML files we just looked at, into the various data warehouse BI Flex metadata tables.x Auto allocation procedure/scenario—the meta-data driven procedure that allocates (maps) available data warehouse target flex attributes to source flex attributes.

BI Flex metadata generation procedures/scenarios—these consist of procedures that run following an auto allocation step, and which create outbound metadata that feeds certain downstream processes.

Source dependent extract (SDE) mapping tasks that obtain both the source flex attributes names and labels extracted from the source system, and make them available to the BI Flex platform.

Source independent load (SIL) tasks that coordinate and launch the various ODI mappings and scenarios mentioned above.

Figure 14:
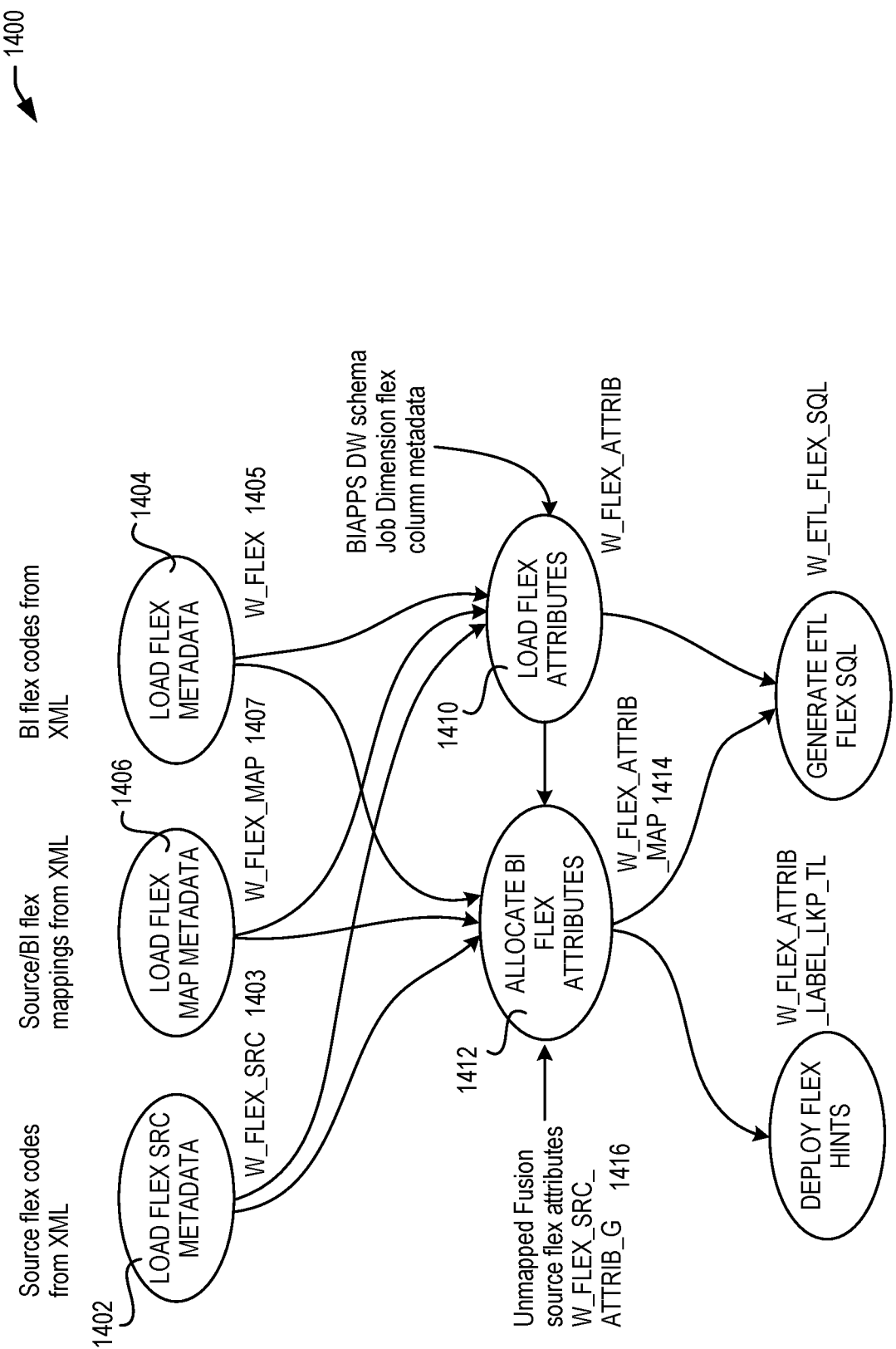
FIG. 14 is another simplified block diagram illustrating at least some additional examples techniques for implementing the features described herein, according to at least one example.

FIG. 14 illustrates architecture 1400 for describing additional details of the BI Flex model. In some examples, the BI Flex metadata loaders include the following components. "LOAD_FLEX_SRC_METADATA" 1402 loads the W_FLEX_SRC_metadata table 1403 with source flex codes and their properties from one or more XML files (e.g., from %_w_flex_src_%.xml). "LOAD_FLEX_METADATA" 1404 loads the W_FLEX metadata table 1405 with target flex codes and their properties from one or more XML files (e.g., from %_w_flex_%.xml). Additionally, "LOAD_FLEX_MAP_METADATA" 1406 loads the W_FLEX_MAP metadata table 1407 with source flex code-target flex code mappings from one or more XML files (e.g., from %_w_flex_map_%.xml). Additionally, in some instances, "LOAD_FLEX_ATTRIBUTES_FROM_FILE" 1408 loads the W_FLEX_ATTRIB metadata table with target flex attribute definitions from one or more XML files (e.g., %_w_flex_attrib_%.xml). Further, in some cases, "LOAD_FLEX_ATTRIBUTES" 1410 loads the W_FLEX_ATTRIB metadata table with flex attribute definitions scraped directly from the target data warehouse dimension master table or extension table columns defined in a database catalog (e.g., the Oracle catalog). The target table name can be obtained via the metadata stored in the W_FLEX table.

In some examples, the BI Flex auto-allocation process may include an "ALLOCATE_BI_FLEX_ATTRIBUTES" process 1412 that is configured to automatically allocate inbound source flex attribute names with available target flex attribute names. In some cases, the allocations can be stored in a BI Flex metadata table call "W_FLEX_ATTRIB_MAP" 1414. This can track the existing allocations, and can enable the auto-allocation process to know whether or not a particular source flex attribute-target flex attribute combination has already been allocated, or whether a particular target flex attribute is currently available for allocation to some inbound source flex attribute. In some cases, the inbound flex source attribute definitions may be provided to the auto-allocation process via the "W_FLEX_SRC_ATTRIB_G" metadata table 1416. Further, the auto-allocation process may be driven by a join of the W_FLEX_SRC 1403, W_FLEX 1405, and W_FLEX_MAP 1407 tables.

Additionally, in some examples, the BI Flex metadata generation tasks include a "DEPLOY_FLEX_HINTS" process 1418 configured to load a metadata table called W_FLEX_ATTRIBUTE_LABEL_LKP_TL 1420 with labels and display hints associated with the mapped BI Flex target attributes. This content can be consumed by the RPD initialization block. Further, the BI Flex metadata generation tasks may include a "GENERATE_ETL_FLEX_SQL" process 1422 that is configured to load a metadata table called W_ETL_FLEX_SQL 1424 with partial SQL expressions or snippets that are used by the extensible KM in loading the actual target table flex columns with source column values.

Figure 15:
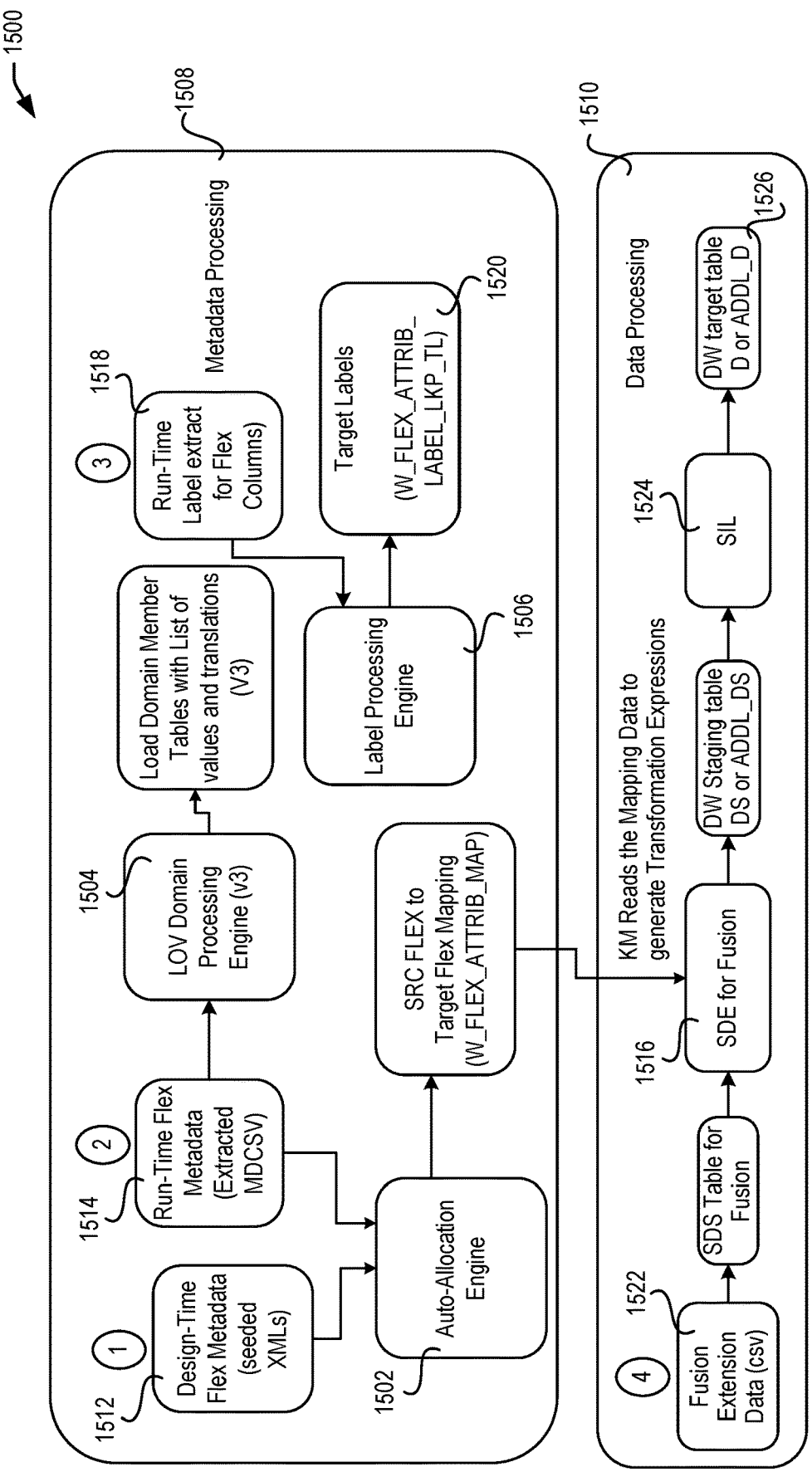
FIG. 15 is another simplified block diagram illustrating at least some additional examples techniques for implementing the features described herein, according to at least one example.

FIG. 15 illustrates an example flow 1500 for implementing the features described herein. For example, FIG. 15 includes an auto-allocation engine 1502, an LOV Domain Processing Engine 1504, and a Label Processing Engine 1506 as part of a Metadata Processing Model 1508. Additionally, a Data Processing Model 1510 enables a KM to read the mapping data and generate transformation expressions. In some examples, both design-time flex metadata 1512 and runtime flex metadata 1514 are fed into the auto-allocation engine 1502. In some examples, the results of the auto-allocation engine 1502 can then get mapped and passed to a Spacial Database Engine (SDE) 1516 of the Data Processing Model 1510.

The runtime flex metadata 1514 can also be processed by the LOV Domain Processing Engine 1504 to load domain member tables with a list of values (LOV) and translations. Additionally, in some cases, runtime labels 1518 can be extracted and processed by the Label Processing Engine 1506 in order to determine target labels 1520. During data processing (e.g., part of the KM or Data Processing Model 1510), extension data 1522 can also be provided to the SDE engine 1516, which can be stored in a Data Warehouse (DW) staging table. The DW staging table data can then be processed by a library 1524 or the like, and finally stored in a DW target table 1526.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   reserving, in a data warehouse table, a first set of extension columns, the data warehouse table containing a plurality of initial columns;
   receiving metadata from a customer source, the metadata identifying an attribute for the data warehouse table;
   extracting the attribute from the metadata;
   determining that the attribute from the metadata does not correspond to a column of the plurality of initial columns in the data warehouse table;
   responsive to determining that the attribute does not correspond to a column of the plurality of initial columns, comparing a data type corresponding to the attribute from the metadata of the customer source to a data type of a next unallocated column in the first set of extension columns from the data warehouse table;
   based at least in part on the comparing, selecting the first set of extension columns in the data warehouse table for mapping based at least in part on the next unallocated column having:
      (a) matching metadata code indicating matching column properties between a source property corresponding to the attribute and a target property corresponding to the next unallocated column; and
      (b) a match between the data type of the next unallocated column in the first set of extension columns and the data type corresponding to the attribute;
   generating code to map the attribute to the next unallocated column based at least in part on the metadata from the customer source;
   mapping the attribute to the next unallocated column based at least in part on the generated code; and
   executing instructions to move data associated with the attribute into the next unallocated column of the data warehouse table.

2. The method of claim 1, wherein the source property corresponding to the attribute is indicated based at least in part on the matching metadata code.

3. The method of claim 1, further comprising pre-seeding one or more fixed columns of the data warehouse table.

4. The method of claim 3, further comprising generating an extended set of data using initial data comprising the one or more pre-seeded fixed columns, and wherein the one or more pre-seeded fixed columns are on a base extension table or an additional extension table.

5. The method of claim 1, wherein a metadata loader loads the metadata into a metadata table.

6. The method of claim 5, wherein the metadata loader includes i) a source metadata code loader, ii) a target metadata code loader, or iii) a source metadata code loader and a target metadata code loader.

7. The method of claim 1, wherein an auto-allocation engine receives design-time flex metadata and runtime flex metadata.

8. The method of claim 1, wherein a token indicates that a first attribute from the customer source is semantically equivalent with a second attribute from a second customer source, wherein the first attribute is associated with a first language, and the second attribute is associated with a second language, and wherein the first attribute and the second attribute belong in the next unallocated column of the data warehouse table.

9. The method of claim 1, wherein the matching metadata code identifies a set of transformation expressions that map the property corresponding to the attribute to the next unallocated column in the first set of extension columns, the set of transformation expressions generated based at least in part on the metadata from the customer source.

10. A system, comprising:
    memory storing computer-executable instructions; and
    one or more hardware processors that access the memory and perform the computer-executable instructions to at least:
       reserve, in a data warehouse table, a first set of extension columns, the data warehouse table containing a plurality of initial columns;
       receive metadata from a customer source, the metadata identifying an attribute for the data warehouse table;
       extract the attribute from the metadata;
       determine that the attribute from the metadata does not correspond to a column of the plurality of initial columns in the data warehouse table;
       responsive to determining that the attribute does not correspond to a column of the plurality of initial columns, compare a data type corresponding to the attribute from the metadata of the customer source to a data type of a next unallocated column in the first set of extension columns from the data warehouse table;
       based at least in part on the instructions to compare, select the first set of extension columns in the data warehouse table for mapping based at least in part on the next unallocated column having:
          (a) matching metadata code indicating matching column properties between a source property corresponding to the attribute and a target property corresponding to the next unallocated column; and
          (b) a match between the data type of the next unallocated column in the first set of extension columns and the data type corresponding to the attribute;
       generate code to map the attribute to the next unallocated column based at least in part on the metadata from the customer source;
       map the attribute to the next unallocated column based at least in part on the generated code; and
       execute instructions to move data associated with the attribute into the next unallocated column of the data warehouse table.

11. The system of claim 10, wherein the source property corresponding to the attribute is indicated based at least in part on the matching metadata code.

12. The system of claim 10, wherein the computer-executable instructions are further performed to at least pre-seed one or more fixed columns of the data warehouse table.

13. The system of claim 12, wherein the computer-executable instructions are further performed to at least generate an extended set of data using initial data comprising the one or more pre-seeded fixed columns, and wherein the one or more pre-seeded fixed columns are on a base extension table or an additional extension table.

14. The system of claim 10, wherein a metadata loader loads the metadata into a metadata table.

15. The system of claim 14, wherein the metadata loader includes i) a source metadata code loader, ii) a target metadata code loader, or iii) a source metadata code loader and a target metadata code loader.

16. One or more non-transitory computer-readable storage medium, storing computer-executable instructions that, when executed by a computer system, cause the computer system to perform operations comprising:
reserving, in a data warehouse table, a first set of extension columns, the data warehouse table containing a plurality of initial columns;
receiving metadata from a customer source, the metadata identifying an attribute for the data warehouse table;
extracting the attribute from the metadata;
determining that the attribute from the metadata does not correspond to a column of the plurality of initial columns in the data warehouse table;
responsive to determining that the attribute does not correspond to a column of the plurality of initial columns, comparing a data type corresponding to the attribute from the metadata of the customer source to a data type of a next unallocated column in the first set of extension columns from the data warehouse table;
based at least in part on the comparing, selecting the first set of extension columns in the data warehouse table for mapping based at least in part on the next unallocated column having:
  (a) matching metadata code indicating matching column properties between a source property corresponding to the attribute and a target property corresponding to the next unallocated column; and
  (b) a match between the data type of the next unallocated column in the first set of extension columns and the data type corresponding to the attribute;
generating code to map the attribute to the next unallocated column based at least in part on the metadata from the customer source;
mapping the attribute to the next unallocated column based at least in part on the generated code; and
executing instructions to move data associated with the attribute into the next unallocated column of the data warehouse table.

17. The one or more non-transitory computer-readable storage medium of claim 16, wherein the source property corresponding to the attribute is indicated based at least in part on the matching metadata code.

18. The one or more non-transitory computer-readable storage medium of claim 16, wherein the operations further comprise pre-seeding one or more fixed columns of the data warehouse table.

19. The one or more non-transitory computer-readable storage medium of claim 18, wherein the operations further comprise generating an extended set of data using initial data comprising the one or more pre-seeded fixed columns, and wherein the one or more pre-seeded fixed columns are on a base extension table or an additional extension table.

20. The one or more non-transitory computer-readable storage medium of claim 16, wherein a metadata loader loads the metadata into a metadata table.

21. The one or more non-transitory computer-readable storage medium of claim 20, wherein the metadata loader includes i) a source metadata code loader, ii) a target metadata code loader, or iii) a source metadata code loader and a target metadata code loader.

\* \* \* \* \*

UNITED STATES PATENT AND TRADEMARK OFFICE
CERTIFICATE OF CORRECTION

PATENT NO. : 11,966,409 B2
APPLICATION NO. : 16/848632
DATED : April 23, 2024
INVENTOR(S) : Wan et al.

It is certified that error appears in the above-identified patent and that said Letters Patent is hereby corrected as shown below:

In the Specification

In Column 8, Line 45, delete "120" and insert -- 106 --, therefor.

In Column 13, Line 12, delete "Internet" and insert -- Internetwork --, therefor.

In Column 23, Line 66, delete "an a" and insert -- a --, therefor.

In Column 25, Line 63, delete "customer." and insert -- customer). --, therefor.

In Column 26, Line 53, delete "their" and insert -- there --, therefor.

In Column 29, Line 46, delete "tables.x" and insert -- tables. --, therefor.

In Column 30, Line 61, delete "Spacial" and insert -- Spatial --, therefor.

Signed and Sealed this
Sixth Day of August, 2024

Katherine Kelly Vidal
*Director of the United States Patent and Trademark Office*